(No Model.)
E. DAWSON.
SCREW DRIVER.
No. 456,300. Patented July 21, 1891.
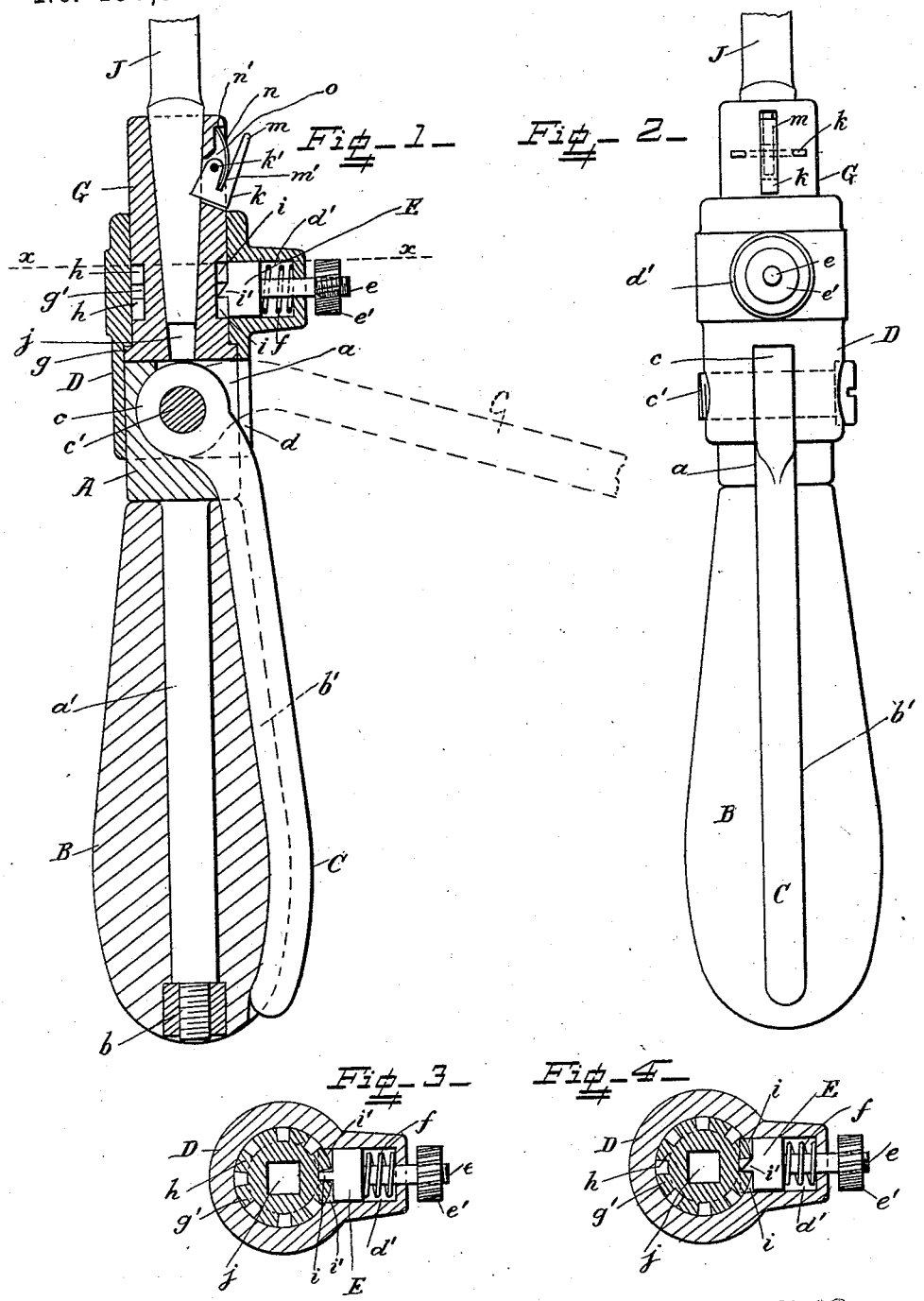
WITNESSES
Wm E. Harvey
John Cullen
INVENTOR
Edward Dawson
by Herbert W. T. Jenner, Attorney

UNITED STATES PATENT OFFICE.

EDWARD DAWSON, OF TERRE HAUTE, INDIANA.

SCREW-DRIVER.

SPECIFICATION forming part of Letters Patent No. 456,300, dated July 21, 1891.

Application filed February 4, 1891. Serial No. 380,164. (No model.)

*To all whom it may concern:*

Be it known that I, EDWARD DAWSON, a citizen of the United States, residing at Terre Haute, in the county of Vigo and State of Indiana, have invented certain new and useful Improvements in Screw-Drivers; and I do hereby declare the following to be a full, clear, and exact description of the invention, such as will enable others skilled in the art to which it appertains to make and use the same.

This invention relates to screw-drivers and other similar tools; and it consists in the novel construction and combination of the parts hereinafter fully described and claimed.

In the drawings, Figure 1 is a longitudinal section through the screw-driver. Fig. 2 is a side view of the same. Fig. 3 is a cross-section taken on the line $x$ $x$ in Fig. 1. Fig. 4 is a similar cross-section, but shows the ratchet-teeth of the pawl in gear with the teeth on the sleeve.

A is a cylindrical head provided with a longitudinal slot $a$ and a cylindrical shaft $a'$.

B is a handle, preferably formed of wood and journaled on the shaft $a'$. The end of the shaft is screw-threaded, and $b$ is a cylindrical nut let into the handle for keeping it on the shaft.

C is a lever provided with a single eye $c$, and $c'$ is a pin which passes through the sleeve D, hereinafter more fully described, and through the head A and eye $c$, so that the lever is pivoted in the slot $a$ of the head A. A groove $b'$ is formed in the handle for the lever C to engage with, as shown in Fig. 1. When the lever is in the groove and is grasped by the hand which also incloses the handle, the head A and sleeve D are turned by turning the handle; but when the lever is turned on its pivot to the position indicated by the dotted lines in Fig. 1 the handle may be held stationary with one hand, and the head A may be turned in either direction by the projecting lever, which is then operated with the other hand. The sleeve D is provided with a slot $d$, corresponding with the slot $a$, and a chamber $d'$ for holding the spring-actuated pawl E. This pawl is cylindrical and is provided with the stem $e$, which passes through a hole in the chamber and has the head $e'$ secured upon it for turning the pawl around in the chamber.

A spring $f$ is arranged within the chamber for operating the pawl.

G is a thimble arranged inside the sleeve D and provided with the flange $g$, which bears against the head A and against a shoulder on the inside of the sleeve, so that the thimble may be free to revolve, but cannot be moved longitudinally. A circumferential groove $g'$ is formed in the thimble, and $h$ are teeth around the thimble upon each side of the said groove. The pawl E is provided with square locking-teeth $i$ and ratchet-teeth $i'$, arranged at right angles to the locking-teeth upon its end. The two teeth $i$ $i$, and also the two teeth $i'$ $i'$, are arranged in line with each other upon opposite sides of the center of the pawl. When the parts are in the positions shown in Figs. 1 and 3, the locking-teeth $i$ engage with the teeth $h$ on the thimble, so that the thimble can be turned back and forth in either direction by turning the handle back and forth. When the pawl is retracted out of engagement with the teeth $h$ and turned around, as shown in Fig. 4, the ratchet-teeth $i'$ engage with the teeth $h$, and the thimble can be revolved continuously in one direction by turning the handle back and forth. The thimble can be revolved in the opposite direction by reversing the position of the ratchet-teeth $i'$ from that shown in Fig. 4.

J is the screw-driver provided with a rectangular end inserted in the tapering rectangular socket $j$ in the thimble G. A catch $k$ is pivoted on the pin $k'$, which passes through holes in the thimble. This catch engages with a notch in the end of the screw-driver and prevents it from coming out of the socket. The catch $k$ is of peculiar shape and is provided with a projecting finger $m$ at the upper end of the catch and a slot $m'$ between the finger and the part which engages with the pivot-pin. A spring $n$ is inserted in this slot and bears against a shoulder $n'$ in the slot $o$ in the thimble, in which slot $o$ the said catch works. The spring $n$ holds the lower square corner of the catch in the notch in the screw-driver, so that an attempt to remove the screw-driver without first pressing the finger to withdraw the catch will have the effect of causing the catch to engage more tightly with the notch.

It is obvious that any other tool—such as a boring-bit provided with a rectangular end which will fit the socket in the thimble—may be operated by the handle in place of the screw-driver. The catch $k$ is very useful when wood-boring tools are used which have to be pulled out of holes.

What I claim is—

1. The combination, with the thimble adapted to hold the tool and provided with a circumferential groove and teeth upon each side of the groove, of the sleeve actuated by the handle, and the retractible spring-actuated pawl supported by the said sleeve and provided with ratchet-teeth and square teeth adapted to engage with the teeth and with the groove on the thimble, substantially as and for the purpose set forth.

2. The combination, with the revoluble head, of the sleeve turning with the said head and provided with an internal shoulder, the thimble adapted to hold the tool and provided with teeth on its periphery, and a flange bearing against the said head and journaled in the sleeve between the said shoulder and head, and the retractible spring-actuated pawl carried by the said sleeve and provided with reversible ratchet-teeth for engaging with the teeth on the thimble, substantially as set forth.

3. The combination, with the revoluble head provided with a slot and a shaft, of the handle journaled on the said shaft and provided with a longitudinal groove, the sleeve adapted to carry the operating-pawl and provided with a slot, the lever working in the two said slots and engaging with the groove in the handle, and a pivot-pin passing through an eye on the lever and securing the said head and sleeve together, substantially as and for the purpose set forth.

In testimony whereof I affix my signature in presence of two witnesses.

EDWARD DAWSON.

Witnesses:
 ALEXANDER MCGREGOR,
 A. G. HERRINGTON.